US009471125B1

(12) United States Patent
Gee et al.

(10) Patent No.: US 9,471,125 B1
(45) Date of Patent: Oct. 18, 2016

(54) ENERGY EFFICIENT PROCESSING DEVICE

(75) Inventors: John K. Gee, Mt. Vernon, IA (US);
Steven E. Koenck, Cedar Rapids, IA (US); David W. Jensen, Marion, IA (US); Allen P. Mass, Lisbon, IA (US); Jeffrey D. Russell, Marion, IA (US); Bradley A. Walker, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 339 days.

(21) Appl. No.: 12/896,111

(22) Filed: Oct. 1, 2010

(51) Int. Cl.
*G06F 1/00* (2006.01)
*G06F 1/32* (2006.01)

(52) U.S. Cl.
CPC .................. *G06F 1/3203* (2013.01)

(58) Field of Classification Search
CPC .................................. G06F 1/3203
USPC ............. 707/204; 712/248, 32, 10; 326/93; 714/718, 723; 717/130, 140; 370/231; 711/109, 110, 219, 141; 713/320, 324, 713/322
See application file for complete search history.

(56) References Cited

U.S. PATENT DOCUMENTS

| 5,883,529 | A * | 3/1999 | Kumata et al. ................. 326/93 |
| 6,014,751 | A * | 1/2000 | Kardach ............... G06F 1/3203 711/141 |
| 6,125,440 | A * | 9/2000 | Osovets .................... G06T 1/20 711/109 |
| 6,598,155 | B1 * | 7/2003 | Ganapathy ............. G06F 9/381 711/110 |
| 6,820,194 | B1 * | 11/2004 | Bidichandani ........ G06F 9/3814 711/219 |
| 7,325,178 | B2 * | 1/2008 | Damodaran et al. ......... 714/718 |
| 8,132,144 | B2 * | 3/2012 | Sundaresan ........... G06F 1/3203 716/100 |
| 2005/0071390 | A1 * | 3/2005 | Midgley et al. ............. 707/204 |
| 2005/0172180 | A1 * | 8/2005 | Damodaran et al. ......... 714/723 |
| 2006/0149921 | A1 * | 7/2006 | Lim ................. 712/10 |
| 2007/0140122 | A1 * | 6/2007 | Murthy ........................ 370/231 |
| 2007/0169001 | A1 * | 7/2007 | Raghunath et al. .......... 717/130 |
| 2008/0098371 | A1 * | 4/2008 | Mitran .................... G06F 8/425 717/140 |
| 2009/0228686 | A1 * | 9/2009 | Koenck et al. ................ 712/32 |
| 2009/0228693 | A1 * | 9/2009 | Koenck et al. .............. 712/248 |
| 2010/0106989 | A1 * | 4/2010 | Chen .................... G06F 1/3228 713/322 |
| 2010/0146315 | A1 * | 6/2010 | Dockser .............. G06F 9/30036 713/320 |
| 2010/0174933 | A1 * | 7/2010 | Lu ......................... G06F 1/3237 713/324 |

OTHER PUBLICATIONS

IEEE Micro-AAMP1 Article "An Advanced-Architecture CMOS/SOS Microprocessor", by David W. Best, Charles E. Kress, Nick M. Mykris, Jeffrey D. Russell, and William J. Smith, published in Aug. 1982, pp. 11-26,IEEE Micro.

* cited by examiner

*Primary Examiner* — Aurel Prifti
(74) *Attorney, Agent, or Firm* — Angel N. Gerdzhikov; Donna P. Suchy; Daniel M. Barbieri

(57) ABSTRACT

A microcoded processor that uses microinstructions to reduce power consumption utilizing low power consumption registers to store most recently retrieved data from a high power consumption control store; a control store in combination with an indirect register file to provide the micro-orders necessary for operation of the microcoded processor without extending the size of the microinstruction; and a microcode driven single clock cycle control to turn off circuitry when not needed.

11 Claims, 7 Drawing Sheets

ENERGY EFFICIENT PROCESSING DEVICE

CROSS-REFERENCE TO RELATED APPLICATIONS

This application relates to co-pending application entitled: Energy Efficient Processing Device filed on May 22, 2007 and having Ser. No. 11/805,510 which application is incorporated herein in its entirety by this reference.

BACKGROUND OF THE INVENTION

1. Field of Invention

The present invention relates generally to the field of processing devices, and in particular to an energy efficient processing device and even more particularly to microcoded processing devices.

2. Description of Related Art

Prior art processing devices may include microprocessors, microcontrollers or digital signal processors. In computer engineering, microarchitecture is the design and layout of a microprocessor, microcontroller, or digital signal processor.

Microarchitecture considerations include overall block design, such as the number of execution units, the type of execution units (e.g. floating point, integer, branch prediction), the nature of the pipelining, cache memory design, and peripheral support.

Microcode is the underlying programming methodology for microprocessors such as the AAMP family of proprietary microprocessors from Rockwell Collins Inc. The term microcode is hereby defined to be: "a level of programming language for microprocessors such that at each line of microcode every internal data path and logical operation is available, without the need for further decoding"; i.e., a line of microcode is comprised of a plurality of micro-orders; where each micro-order controls a fundamental data path or operation internal to the microprocessor. Depending on the complexity of the microarchitecture, a typical line of microcode may contain 5 to 15 micro-orders.

A computer operation is an operation specified by an instruction stored in a computer's memory. A control unit in a typical computer uses the instruction (e.g. operation code, or opcode), and decodes the opcode and other bits in the instruction to perform required micro-operations. Decoding of the opcode increases the time required to execute an instruction. The control store is a memory that contains the CPU's microprogram, and is accessed by a microsequencer. Microoperations are implemented by hardware, often involving combinational circuits. In a CPU, a control unit is said to be hardwired when the control logic expressions are directly implemented with logic gates or in a PLA (programmable logic array). In contrast to this hardware approach for the control logic expressions, a more flexible software approach may be employed with a microprogrammed control unit, where the control signals to be generated at a given time step are stored together in a control word called a microinstruction. The collection of these microinstructions or micro-orders is the microprogram or microcode, which is stored in a memory element termed the control store.

Thus the outputs of the control unit direct the CPU operations, and a control unit can be thought of as a finite state machine. Words of the microprogram are selected by a microsequencer and the bits from those words directly control the different parts of the device, including the registers, arithmetic and logic units, instruction registers, buses, and off-chip input/output. In modern computers, each of these subsystems may itself have its own subsidiary controller, with the control unit acting as a supervisor.

All types of control units generate electronic control signals that control other parts of a CPU. Control units are usually one of these two types: microcoded control units or hardware control units. In a microcoded control unit, a program reads values from memory, and generates control signals. The program itself is executed by a digital circuit called a microsequencer. In a hardware control unit, a digital circuit generates the control signals directly from combinational logic.

Hence microprogramming is a systematic technique for implementing the control unit of a computer via a microcoded control unit. Microprogramming is a form of stored-program logic that substitutes for sequential-logic control circuitry. A microinstruction is an instruction that controls data flow and instruction-execution sequencing in a processor at a more fundamental level than machine instructions; thus, a series of microinstructions is commonly necessary to perform a particular computing function.

A central processing unit (CPU) in a computer system is generally comprised of a data path unit and a control unit, with the control unit directing the data path unit. The data path unit or datapath includes registers, function units such as ALUs (arithmetic logic units), shifters, interface units for main memory and I/O, random access memory (RAM), including scratchpad RAM, and internal buses. Scratchpad RAM is typically a local dedicated memory cache reserved for direct and private usage by the CPU. A cache is typically used in the prior art to temporarily store copies of data that reside in slower main memory.

The control unit controls the steps taken by the data path unit during the execution of a machine instruction, microinstruction or macroinstruction (e.g., load, add, store, conditional branch) by the datapath. Each step in the execution of a macroinstruction is a transfer of information within the data path, possibly including the transformation of data, address, or instruction bits by the function units. The transfer is often a register transfer and is accomplished by sending a copy of (i.e. gating out) register contents onto internal processor buses, selecting the operation of ALUs, shifters, and the like, and receiving (i.e., gating in) new values for registers. Control signals consist of enabling signals to gates that control sending or receiving of data at the registers, termed control points, and operation selection signals. The control signals identify the micro-operations required for each register transfer and are supplied by the control unit. A complete macroinstruction is executed by generating an appropriately timed sequence of groups of control signals.

A complex instruction set computer (CISC) is a microprocessor instruction set architecture (ISA) in which each instruction can execute several low-level operations, such as a load from memory, an arithmetic operation, and a memory store, all in a single instruction, and from within the CPU. The ISA specifies the instructions, their binary formats, the complete effect of each operation in a CPU, the visible registers of the machine, and any other aspects of the system that affect how it is programmed. The term CISC was coined to contrast to the ISA for a reduced instruction set computer (RISC). Before RISC processors were designed, many computer architects designed instruction sets to support high-level programming languages by providing "high-level" instructions such as procedure call and return, loop instructions such as "decrement and branch if non-zero" and complex addressing modes, to allow data structure and array accesses to be combined into a single instruction. An example of a CISC CPU is the Intel iAPX 432 microprocessor architecture, which supported object-oriented programming in hardware, even providing for automatic garbage collection for deallocated objects in memory. The iAPX architecture was so complex for its time that it had to fit on multiple chips. Another example is the Intel x86 microprocessor, used in personal computers. Further, Directly Executable High Level Language (Directly Executable HLL) design CPUs can take a high level language and directly execute it by microcode, without compilation. The IBM Future Systems project and Data General Fountainhead Processor are examples of Directly Executable HLL design.

The compact nature of the CISC ISA results in smaller program sizes and fewer calls to main memory. A control store (fast memory within the CPU) is often prominent in a CISC design, and a CISC CPU will lack the decoding logic stage found in a RISC CPU.

A Very Long Instruction Word (VLIW) architecture refers to a CPU architectural approach to take advantage of instruction level parallelism. In Very Long Instruction Word CPUs, many statically scheduled, tightly coupled, fine-grained operations execute in parallel within a single instruction stream. A processor that executes different substeps of sequential instructions simultaneously (pipelining), that employs parallel (superscalar) execution and that executes instructions out of order (branch prediction) can achieve significant performance improvements, at the cost of increased hardware complexity and power consumption. The VLIW approach offers benefits similar to these techniques but employs a compiler to determine which operations may be executed in parallel, and which branch is most likely to be executed, during compiling of a computer program. VLIW architectures therefore may offer improved computational power with less hardware, at the cost of greater compiler complexity. One VLIW instruction may perform multiple operations; with one instruction operation for each execution unit of the device. For example, if a VLIW CPU has three execution units, then a VLIW instruction for that chip would have three operation fields, each field specifying what operation should be done on that corresponding execution unit. To accommodate these operation fields, VLIW instructions are usually at least 64 bits in width, and on some architectures wider.

As stated, a reduced instruction set computer, or RISC, is a microprocessor instruction set architecture (ISA) that favors a simpler set of instructions. The idea was originally inspired by the discovery that many available instructions in CISC CPU architectures were seldom used by the programs that were running on them. Also these more complex features took several processor cycles to be performed. Additionally, the performance gap between the processor and main memory was increasing. This led to a number of techniques to streamline processing within the CPU, while at the same time attempting to reduce the total number of memory accesses. A RISC microprocessor utilizes and emphasizes a decoding logic stage rather than emphasizing a control store, as in a CISC chip. In addition, the term "Load-Store" is often used to describe RISC processors. Instead of the CPU handling many addressing modes, load-store architecture uses a separate unit dedicated to handling very simple forms of load and store operations, and only register-to-register operations are allowed. By contrast, CISC processors are termed "register-memory" or "memory-memory". Thus RISC compilers keep operands in registers (the operand being the part of a machine instruction that references data or a peripheral device; in the instruction, ADD A to B, A and B are the operands, and ADD is the operation code), in order to employ register-to-register instructions. CISC compilers use an ideal addressing mode and the shortest instruction format to add operands in memory, and make repeated memory accesses in a calculation. RISC compilers however, prefer to use LOAD and STORE instructions to access memory so that operands are not implicitly discarded after being fetched, as in CISC memory-to-memory architecture.

Notwithstanding the above, differences between RISC and CISC processors have blurred over time. A program execution time is equal to the total number of executed instruction times the cycles per instruction and the time per cycle. In modern CPU ISAs, many instructions, no matter how rarely-used, are often included if the cycle-time can be made small and the hardware and/or control store exists for implementing the instructions. Thus the number of instructions is not reduced in modern CPUs; only the cycle time is reduced. Further, even more designs with fanciful acronyms have appeared, including NISC (No Instruction Set Computer) and WISC (Writable Instruction Set Computer) for embedded processors that have rewritable microcode. There are ideas for processors that are reconfigurable, even reconfigurable during runtime, in FPGA logic. An example of a recent processor that provides direct support for the Java language, in hardware, is U.S. Pat. No. 6,317,872, incorporated herein by its entirety. An example of the use of microcode as the executable language on an embedded processor is in public use from the assignee of the present invention in a GPS product placed in public use around 1997.

However, ultimately a microprocessor ISA is useful only if it enables one to achieve suitable performance for the task at hand. What is not found in the prior art is a system and method to process data with much reduced power consumption and heat generation. The present invention addresses these concerns.

SUMMARY OF THE INVENTION

Accordingly, the present invention is directed to a processing device, such as a microprocessor that provides high computing performance with a small footprint and low power consumption.

The processor of the present invention includes one or more cores, which are minimal but complete computing units, each having a microcoded architecture, employing lines of non-opcode-oriented, fully decoded microcode (microinstructions), that do not require an instruction decoder for execution, in a stored microprogram (which may be loaded from external memory), and other functional units for data processing and manipulation, to give VLIW-type performance at reduced power consumption.

The processor core of the present invention employs microcode instructions for the native execution language, with preferably no opcodes. The microcode instructions of the core are very efficient, fine grained logic and provide control for data manipulation capability. One line of microcode in the core can be equal or even superior to specialized opcodes assembled by a typical assembly language assembler. The use of microcode instructions comprised of multiple micro-orders provides a form of inherent parallelism, providing multiple simultaneous data manipulation operations per line of microcode. In certain cases, a single line of microcode of the present invention can sometimes be equivalent in computing capability to multiple lines of High Level Language (HLL) code.

Microprocessors may use several different types of memory storage elements for operation, including register files, RAM, and Flash ROM. The main advantage of RAM over register files is higher density, which results in smaller integrated circuit chip size. In general, RAM requires substantially more power per bit for read and write operations than the flip flops used to implement a register file. In power sensitive applications, it is beneficial to utilize register files rather than RAM whenever possible while still maintaining an acceptable chip size.

As explained further herein, the present invention may include a microprocessor with a register file cache comprised of latches or flip flops used to store the most recent microinstruction accessed from the main memory, which is preferably RAM. Unlike the typical virtual memory organization, this "look behind cache" is written with a copy of the microinstruction that is retrieved with every access of the main memory. If the microinstruction from a requested memory location is present in the look behind cache, the main memory need not be accessed at all, so only the register file is accessed, which results in lower power consumption while operating at full speed. This look behind cache reduces the number of accesses to the main memory with its generally higher power consumption.

The processor of the present invention may utilize indirect registers to provide an indirect control store to accomplish reduction in power consumption by replacing a larger microinstruction field with a smaller micro-order field and some indirect registers.

The present invention may also include microcode controlled fine grain clock gating to turn on and off gates for durations as short as one clock cycle, thereby reducing wasted power consumption associated with gates that are being unnecessarily transitioned by a clock cycle and are not being used.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention. Like numerals in this description refer to like matter throughout.

Figure 1:
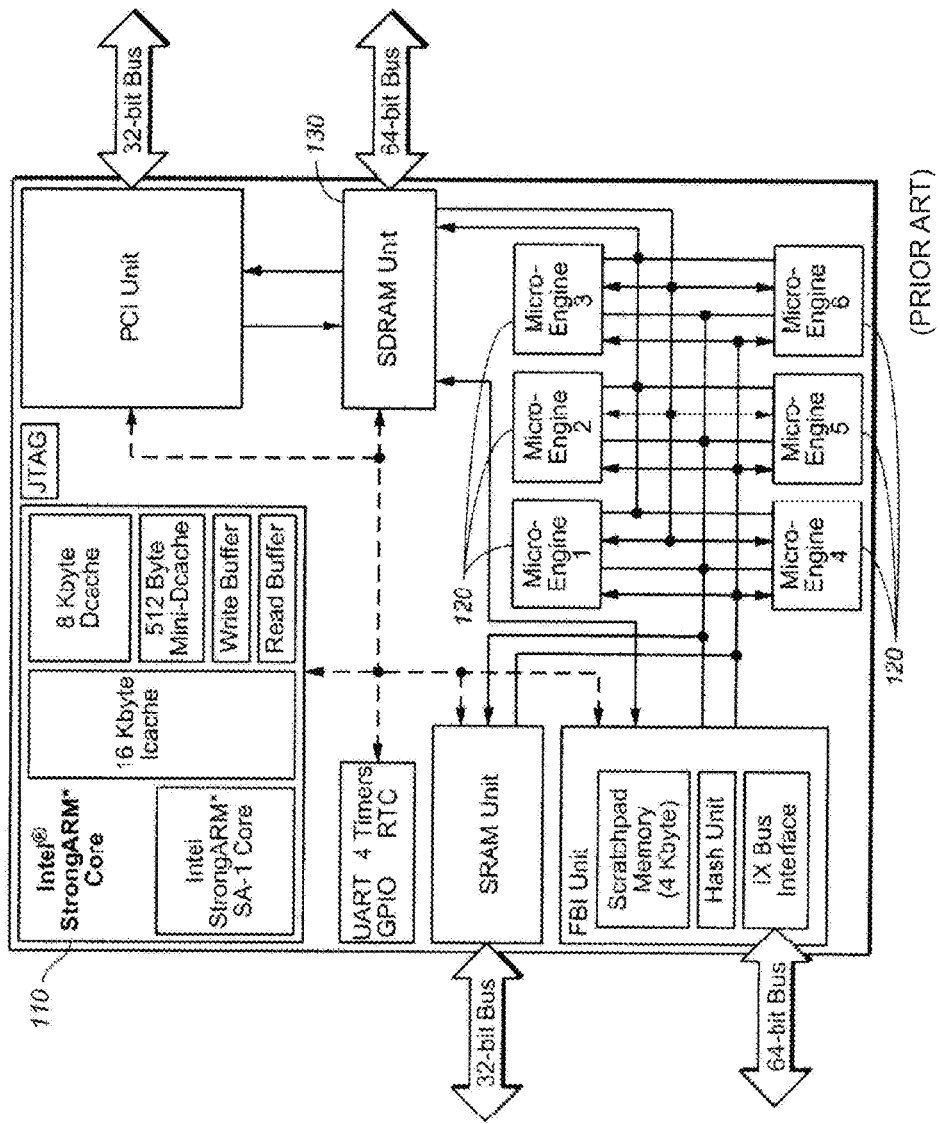
FIG. 1 is a schematic of a prior art network processor, the Intel IXP1200.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

FIG. 1 is a schematic of a prior art network processor, the Intel IXP1200. This prior art network processor utilizes numerous opcodes in its microarchitecture. The Intel IXP network processor family is a microcoded processor family, where each processor has a relatively small microcode memory (thousands of lines of microcode). The microcode may be fixed (ROM) or variable (RAM), but is typically configured in some initialization phase, and remains in place for the duration of the computing mission. An Intel StrongARM Core 110 is a control unit that performs logical operations and several microengines 120 that may be cores from the StrongARM family provide switching, with on-board SRAM 130. In a programmable microprocessor, the complete macroinstruction is executed by generating an appropriately timed sequence of groups of control signals.

While the micro-operations in the Intel IXP are ultimately implemented by hardware, they are generated through microinstructions in the form of operational codes which require more time to execute than a fully decoded microcoded control signal for use as a micro-operation. Conversely, the processor of the present invention does not require or utilize opcodes.

Thus while the use of microcoded network processors for implementation of functions such as network routing is well known in the art, such as in the Intel IXP1200 family, one novelty of the processing device of the present invention is in its architecture, and particularly, its use of fully decoded microcoded controls (fully decoded microinstructions), rather than in the use of extensive opcodes like a typical microprocessor (Intel IXP 1200). The fully decoded microcode of the present invention enables a rich set of controls and data manipulation capabilities. A key benefit of fully decoded microcode is that it enables an extremely simple microarchitecture. In an embodiment of the invention, a processing device of the present invention may have the capability to manage a subnetwork with up to 16,000 nodes, and may be implemented in as few as 10,000 to 20,000 gates and 132 k bytes of RAM. In a 90 nm CMOS process, this may only require approximately 1.45 $mm^2$ of chip area and operate on nominally 4 milliwatts (mW) at 100 MHz.

Figure 2:
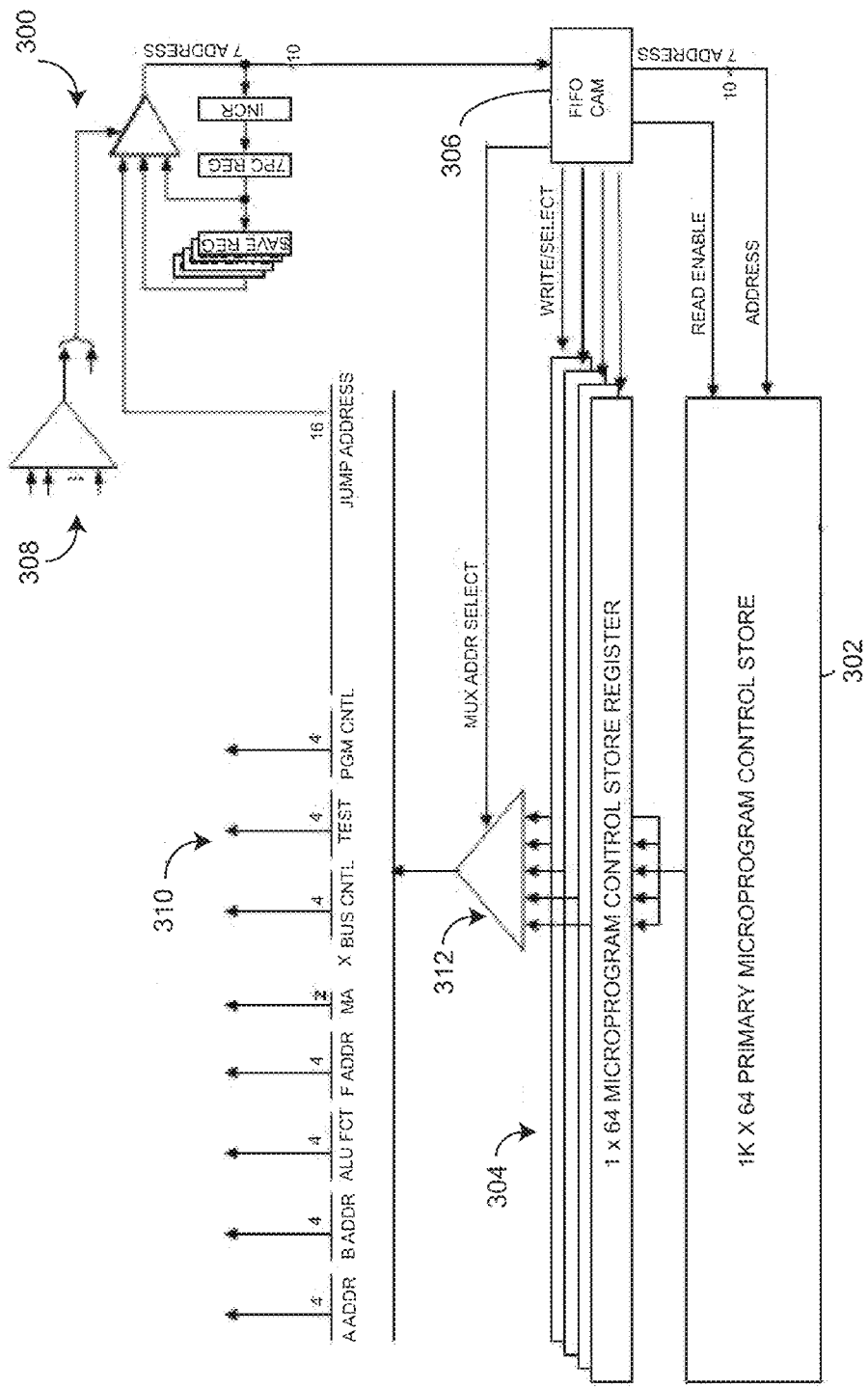
FIG. 2 shows a block diagram of a control unit of a processing device in accordance with an embodiment of the present invention, which includes a "look behind" control store register cache.

Referring to FIG. 2 there is shown a block diagram of a control unit of a processing device in accordance with an embodiment of the present invention, which includes a "look behind" control store register cache "look behind control store register cache", generally designated 300, of the present invention which could be the subject of an adaptation of any microprocessor such as the AAMP. The term "look behind control register cache" is defined herein to mean a plurality of registers configured to receive and store data from a predetermined number of most recently accessed memory locations in a control store. The control store could be any typical memory used to store microcode for processor operation and control, such as RAM, for example. Unlike most cache memory systems, the access time for data from the plurality of registers is not substantially faster than the access time for the same data stored in the control store. Registers, however, may operate using 5 to 10 times less power than the RAM typically used for control store memory. Shown is the plurality 304 of control store registers which capture and store the last memory locations in the control store 302 to be accessed. The number of registers is a design choice, with more registers providing for an increased ability to "look behind" further, but at some point a performance penalty may arise if too many registers are included in the plurality 304 of registers. It is believed that in some situations 32 instruction words may be a preferred number of registers. In an exemplary embodiment, a first-in, first-out content addressable memory 306 (FIFO CAM) is provided in the control path to control store 302 to provide control of data being stored in plurality 304 of registers. Only the most recent data accessed from control store is stored in the plurality 304 of registers. Other types of storage management policies such as least recently used, most recently used or software specified order may be employed to manage the contents of the register file cache.

Also shown is control logic 308, which is typical of prior art control units. The contents of the microinstruction 310 are shown with representative control bits. The data output path from plurality 304 includes a MUX address select function for controlling the output of the plurality 304 of registers. The frequency of retrieving data from the control store 302, with its relatively high power consumption, is reduced by utilizing data within the plurality 304 of registers. Note that the present invention is optimized for conserving power and not for increasing the speed at which data is accessed. The speed of accessing data from the plurality 304 of registers is not substantially faster than the speed at which the same data could have been accessed from the control store 302 in normal operation. It may be preferred that data access speeds be substantially the same from the control store 302 and from the plurality 304 of registers. The look behind cache 300 of the present invention may be constructed and or configured so as to not substantially speed up data retrieval when compared to data retrieval from the control store 302.

The described look behind cache system will be most effective in reducing power consumption when the processor is executing program loops whose microinstructions reside mostly if not completely in the register file cache. If a program loop executes completely from the register file, the power required to access microinstructions will be reduced by the same 5 to 10 times improvement factor.

Figure 3:
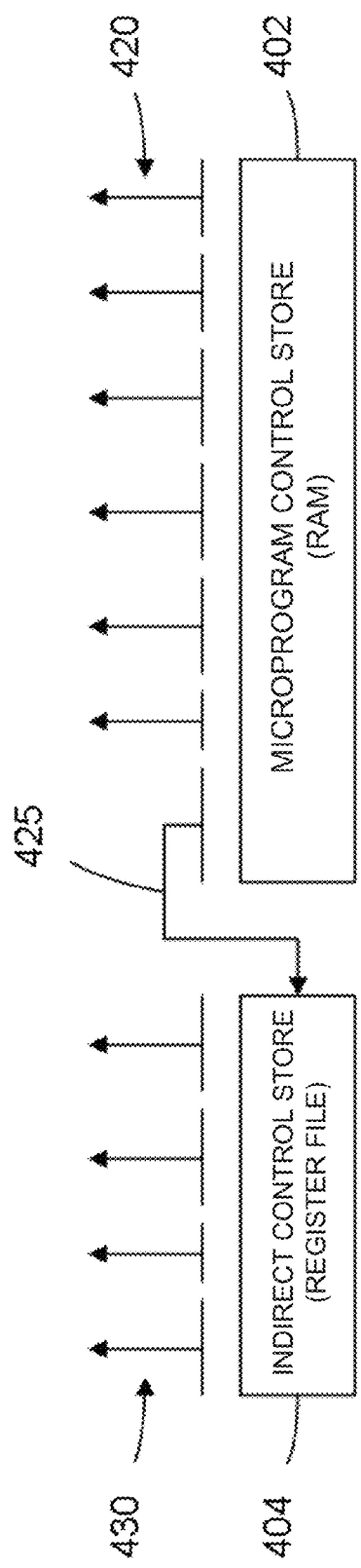
FIG. 3 shows a diagram of an alternate reduced power microprogram control store for a processing device in accordance with an embodiment of the present invention. The Figure shows the use of indirect external registers to reduce the word width of a control field.
Figure 4:
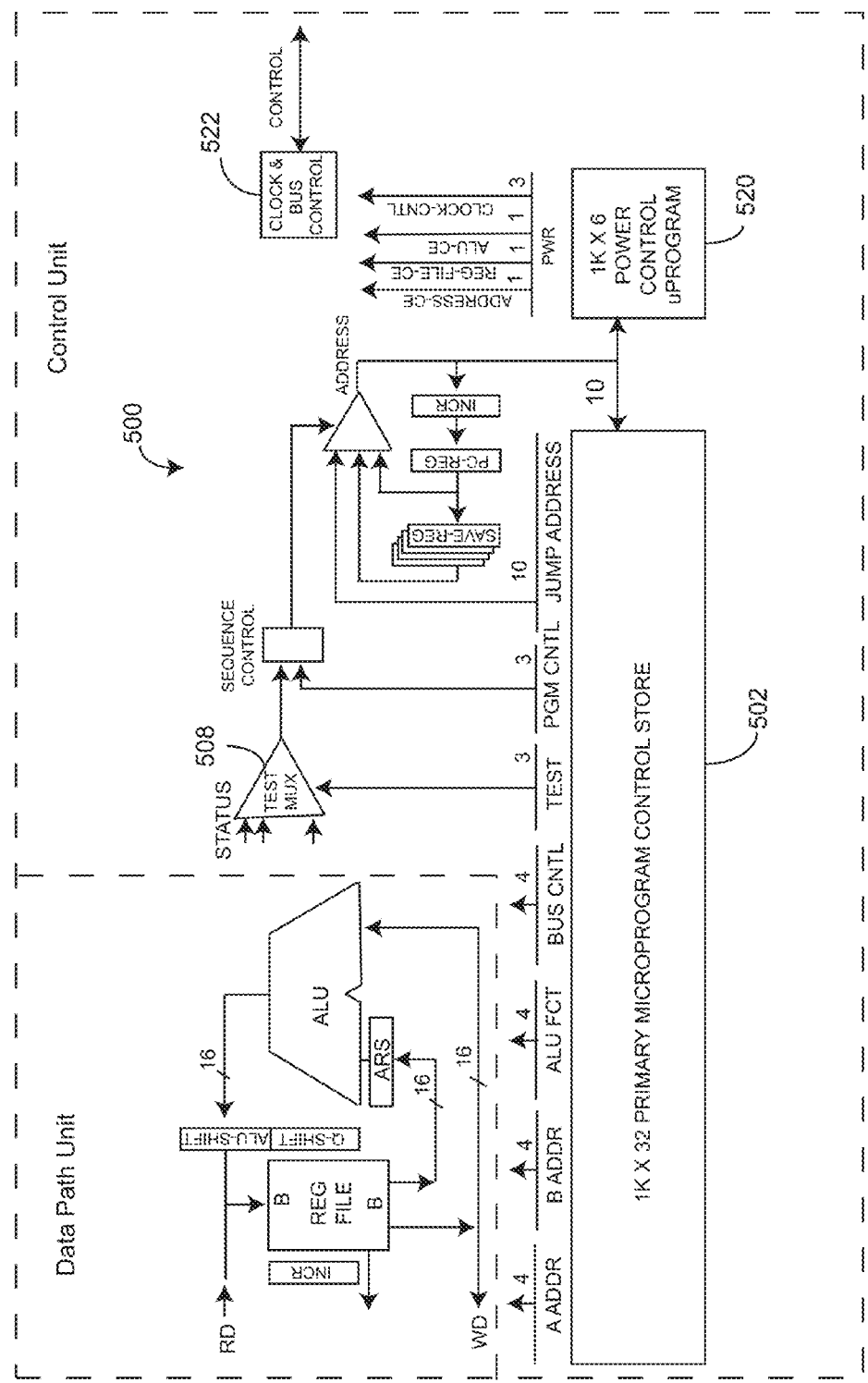
FIG. 4 shows a microcode machine with power control microcode.

Now referring to FIG. 3 there is shown a diagram of the microprogram control store portion of a microcoded processor of the present invention. The control store 402 contains a combination of micro-orders 420 and addressing bits 425 to select one of a plurality of words stored in a register file 404. The words stored in the register file 404 may be loaded at the same time as the microprogram control store, or they may be updated during microprogram execution. It is contemplated that this indirect addressing mode could be extended, such that a register file could be used to address another register file. The outputs 430 of the register file 404 function as additional micro-orders. The number of addressing bits 425 may be relatively small compared to the number of register file outputs 430. Power saving is accomplished by reducing the number of outputs of the microprogram control store RAM 402 with relatively high power consumption, and using the outputs of the register file 404 with relatively low power consumption as an indirect control store to provide the micro-orders necessary for operation of the microcoded processor. The number of combinations of micro-orders that may be provided by the indirect control store is limited to the size of the register file. By way of example, 4 address bits from the microprogram control store RAM 402 would address up to 16 register file 404 locations. If the output 430 of the register file is 24 bits wide, and if the power consumption of a register bit is 10% of the power consumption of a RAM bit, then the power consumption of this configuration would be reduced as shown in the calculation:

$x$=power required to read a single RAM bit from microprogram control store $24x$=power required to read 24 RAM bits from microprogram control store $4x$=power required to read 4 RAM bits from microprogram control store $24x*0.1=2.4x$=power to read 24 register bits from indirect control store $4x+2.4x=6.4x$=total power for the register indirect control store read operation $6.4x/24x=0.27$ or 27% of the power required to read 24 bits directly from RAM Now referring to FIG. 4 there is shown a block diagram of a microprocessor, generally designated 500, of the present invention which includes control logic 508 which is similar to control logic 408 and 308 of FIGS. 3 and 2 respectively. Similarly control store 502 is shown as well. (Note: a 1 k×32 control store is shown but other sizes are a matter of design choice.) Similarly, a novel power control microprogram function 520 is shown as a 1 k×6 configuration for providing Address CE, Reg File CE, ALU CE and Clock Control state information to clock and bus control 522; however alternate sizes and configurations are contemplated. The addresses for the primary control store 502 are used as the addresses for the power control microprogram function 520, which provides for the ability to enable and disable flip flop circuits with a duration as low as one clock cycle. Other processor blocks or resources such as on-chip power islands, memory, or interface circuits may similarly be enabled or disabled by the power control microprogram 520.

Figure 5:
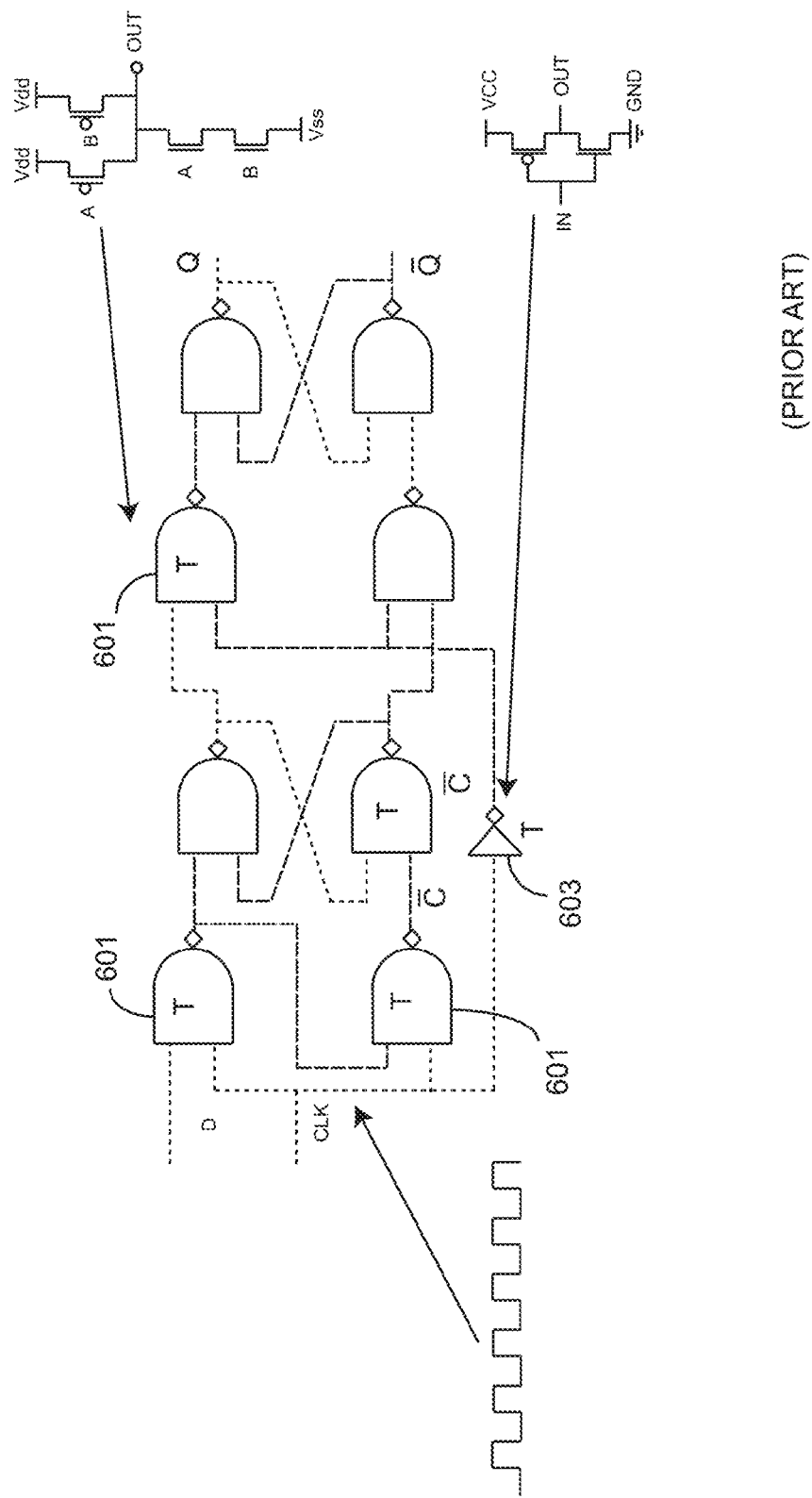
FIG. 5 shows a logic circuit of a D flip flop of the prior art, to show clocking power expended on every transition.

Now referring to FIG. 5 there is shown a prior art flip flop circuit. It is important to note that; even without data changes, the clock in such a circuit causes transitions continuously in 5 of the 9 logic elements (4 NAND gates 601 and one NOT gate 603 all labeled with a T, for transition). These transitions consumer power even when the flip flop circuit is not being used.

Figure 6:
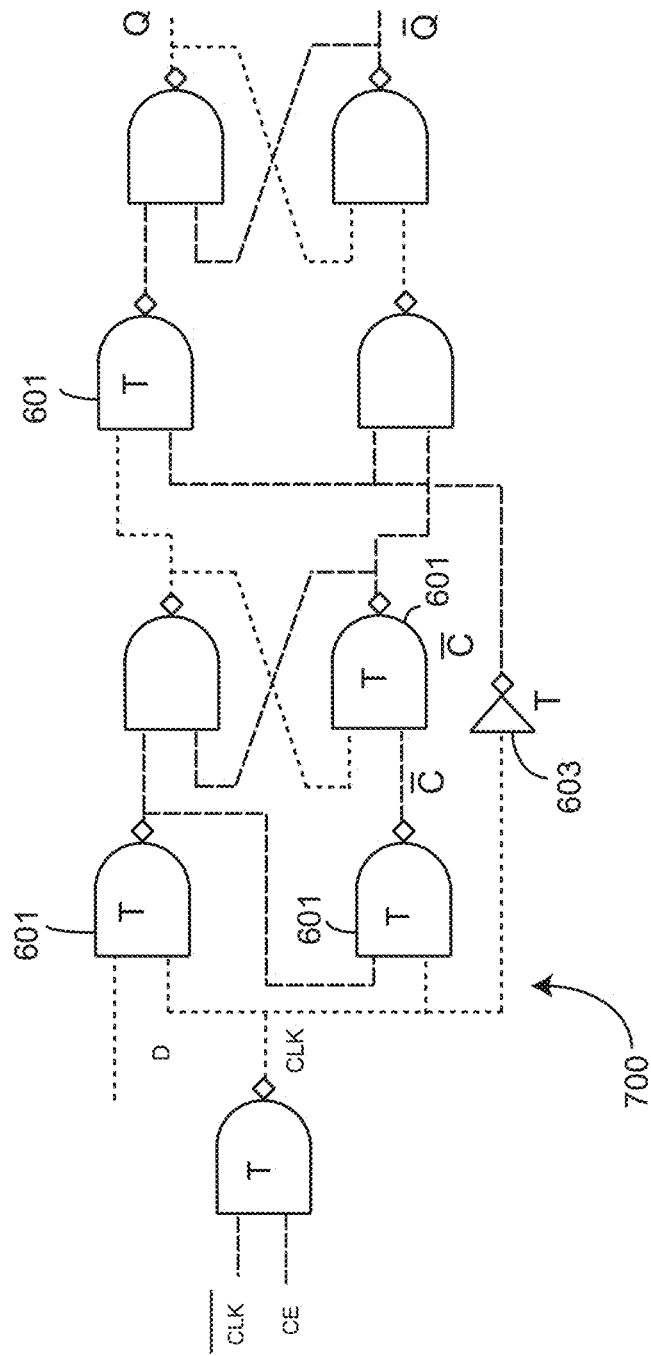
FIG. 6 shows a modified D flip flop, of the present invention, which includes an extra control gate with Clock Enable (CE)=1.

Now referring to FIG. 6 there is shown a new flip flop circuit with an additional control gate for providing clock enable functionality. It can be seen here with the Clock Enable (CE)=1 (enabled) 6 logic elements experience transition and labeled with a T. Assuming an equal power signature for NAND and NOT gates an increase from 5 to 6 transitioning gates results in a 20% increase in power when the clock is enabled.

Figure 7:
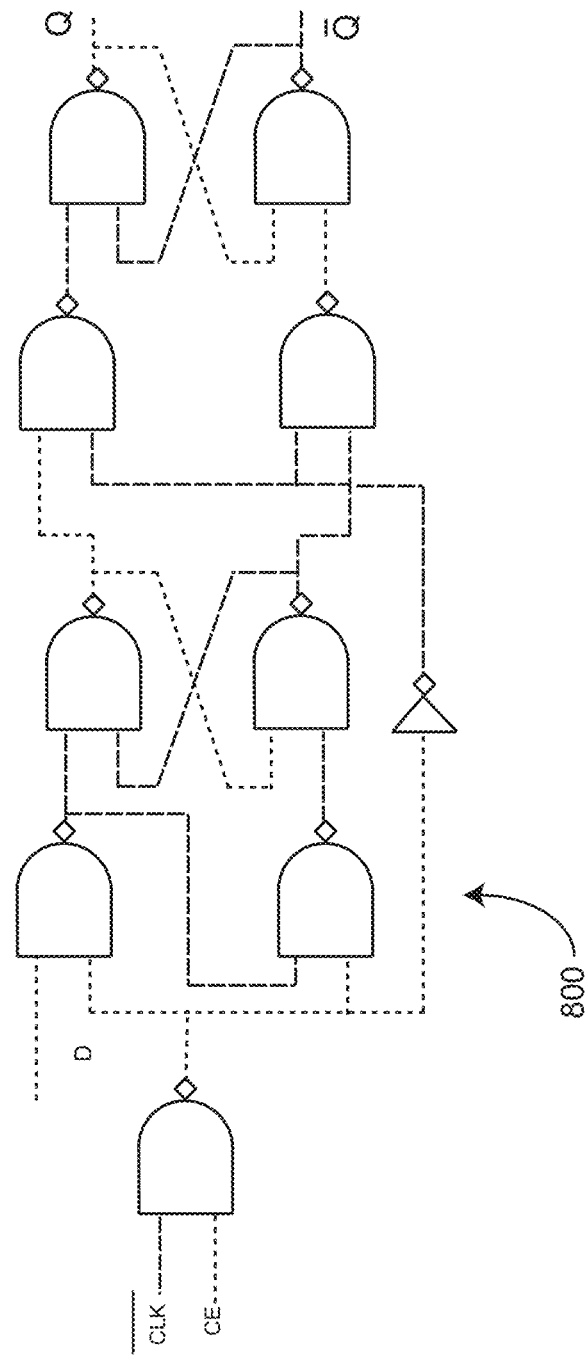
FIG. 7 shows the modified D flip flop of FIG. 6 with the Clock Enable=0.

Now referring to FIG. 7 which is the flip flop circuit of FIG. 6 where the clock enable=0 then the number of transitioning gates goes to zero. The extra gate would therefore be added only to circuits where there is an expectation that the clock would be enabled significantly less than 80% of the clock cycles. This is an application specific parameter and is the subject of design consideration on a case by case basis.

Another example of utility of the logic circuit shut-down mechanism of the present invention would be an ALU which is 32 bit (or larger) which could, during appropriate times, be changed to an 8 bit arithmetic operation by turning off 75% of the un-needed logic and register circuits. Control and management of the ALU bit width could be implemented in microcode. This microcode instructed flexible processor configuration with a less complex, lower power consuming mode for a duration as little as a single clock cycle is believed to be a beneficial aspect of the present invention.

It is intended that the scope of the present invention extends to all such modifications and/or additions and that the scope of the present invention is limited solely by the claims set forth below.

The invention claimed is:

1. A processing device, comprising:
 a microprocessor comprising a control unit and a datapath unit, said control unit directing said datapath unit;
 said control unit comprising:
 a control store having therein a microprogram which comprises fully decoded microinstructions;
 a look behind control store register cache comprising a plurality of registers configured to receive and store data from a predetermined number of previously accessed memory locations in said control store and a clock transition isolating gate which provides clock enable signals for power reduction, the plurality of registers including latches or flip flops; and
 a controller for controlling access to data stored in said look behind control store register cache and said control store, wherein the look behind control store register cache is written and stores a copy of a microinstruction accessed from the control store, wherein the look behind control store register cache is accessed when a requested microinstruction is present within the look behind control store register cache and access to the control store is avoided.

2. The processing device of claim 1, wherein said controller comprises a first in, first out content addressable memory.

3. The processing device of claim 1, wherein the control store includes random access memory.

4. The processing device of claim 1, wherein a number of accesses to the control store is reduced due to access to the look behind control store register cache.

5. The processing device of claim 1, wherein the look behind control store register cache includes latches.

6. The processing device of claim 1, wherein the look behind control store register cache includes flip flops.

7. A method of reducing power consumed by a microprocessor comprising the steps of:
 providing a data unit and a control unit comprising a control store, which data unit and control unit are configured, in combination, to retrieve microinstructions from the control store at a control store data access rate;
 providing a look behind control store register cache, which receives and stores a copy of data from a predetermined number of previously accessed memory locations in said control store, the look behind control store register cache including latches or flip flops and a clock transition isolating gate which provides clock enable signals for power reduction; and
 retrieving microinstruction data from said look behind control store register cache, wherein said step of retrieving microinstruction data is accomplished without accessing the control store.

8. The processing device of claim 7, wherein the control store includes random access memory.

9. The processing device of claim 7, wherein a number of accesses to the control store is reduced due to access to the look behind control store register cache.

10. The processing device of claim 7, wherein the look behind control store register cache includes latches.

11. The processing device of claim 7, wherein the look behind control store register cache includes flip flops.

* * * * *